United States Patent [19]

Ritter et al.

[11] Patent Number: 4,779,944
[45] Date of Patent: Oct. 25, 1988

[54] INTEGRATED LASER BEAM SCANNING SYSTEM

[75] Inventors: Joahim A. Ritter, Webster; Charles J. Kramer, Pittsford, both of N.Y.

[73] Assignee: Holotek Ltd., Rochester, N.Y.

[21] Appl. No.: 125,303

[22] Filed: Nov. 25, 1987

[51] Int. Cl.⁴ .............. G02B 26/10; G01D 15/14; G03G 15/28; G03G 15/30
[52] U.S. Cl. .................. 350/3.71; 350/583; 350/321; 346/160; 355/8
[58] Field of Search .............. 350/3.71, 6.7, 6.8, 350/582, 583, 321; 346/160; 355/8

[56] References Cited

U.S. PATENT DOCUMENTS 4,397,521  8/1983  Antos et al. ............... 350/6.8
4,610,500  9/1986  Kramer ..................... 350/3.71

OTHER PUBLICATIONS

BEI Motion Systems, Little Rock, Arkansas 72203, product information, "BEI Optical Encoders A Class of One" (1986), 3 pages.
Teledyne/Gurley, Troy, N.Y. 12181-0088, product information on Incremental Disks, 2 pages (Jul. 1986).
A. Arimoto et al, "Dual Beam Laser Diode Scanning System for Ultrahigh Speed Laser Beam Printers Using a Spot Control Method", *Applied Optics*, vol. 26, No. 13, Jul. 1, 1987, pp. 2254–2257.
W. H. White, "Laser Typesetters Bring Higher Resolutions to Electronic Output", *Elec. Publ. & Pr.*, Aug.-/Sep. 1986, pp. 40–42.

Primary Examiner—Bruce Y. Arnold
Attorney, Agent, or Firm—Martin LuKacher

[57] ABSTRACT

An integrated laser scanning system for scanning a modulated beam across an image surface, which may be a receptor on which the image is scanned, is provided by a rigid housing having a central plate and walls which define a plurality of cells on opposite sides of the central plate, some of which may extend through the central plate. A deflector, preferably having a rotatable hologon, a laser and optical components, including an assembly of components for processing and modulating the laser beam, are mounted in different ones of the cells and define a beam path which is folded and extends in one direction over the central plate and in an opposite direction out of the housing toward the image surface.

17 Claims, 8 Drawing Sheets

4,779,944

INTEGRATED LASER BEAM SCANNING SYSTEM

DESCRIPTION

The Present invention relates to optical scanning systems, and Particularly to laser beam scanner systems using a hologon deflector (diffraction grating based deflector element) which is integrated with a laser and other optical components in a body or housing which supports the laser, deflector and the components to provide a system for scanning lines across an image surface such as a printing plate or other image receptor.

The invention is especially suitable for use in laser imagers which produce color separations used in printing halftone images. Other applications for the invention may be in systems for accurate reproduction of various images in addition to halftone images, including alphanumeric and line graphic images.

Laser scanners are made up of a number of components which are usually mounted separately in the housing of a printer. The alignment of the components is critical to the accuracy of scanning. To this end it has been proposed to mount the laser, deflector and associated optical components such as lenses, mirrors and optical modulators, on a heavy, stiff plate. The use of such a plate limits the design of the printer, which must also house other reprographic elements, such as a xerographic drum or plateholder, electronics hardware, xerographic processing equipment and equipment for mounting, feeding and otherwise handling the medium on which the image is reproduced.

It is the principal feature of this invention to provide an integrated scanner system wherein the laser, deflector and optical components of the scanner, and if desired, the electronics hardware associated therewith may be combined with a body; the body having means for housing the components assembled in alignment and also having sufficient stiffness and rigidity to maintain the alignment of the components while they are in operation.

It is another feature of the invention to provide an integrated laser scanner system in which the areas through which the laser beam passes are covered and sealed against contamination. Dust and volatile toners are prevented from entering the areas critical to the optical performance of the scanner. Foreign material is prevented from being deposited upon the deflector and other optical elements thereby interfering with their performance.

Still another feature of the invention is to provide an integrated laser scanning system in which the components are readily accessible for repair, maintenance and replacement.

Briefly described, an integrated optical scanning system embodying the invention has a housing made up of a plate, preferably centrally located and from the opposite sides of which a plurality of walls extend so as to define a plurality of cells. The walls and the plate define a rigid body and the plate provides a platform to which the laser, deflector and other optical components of the scanning system may be mounted in accurately aligned position; the stiffness and rigidity of the plate maintaining the requisite alignment of the components. The optical elements may include an assembly containing a plurality of these elements which are adapted to modulate and otherwise control the beam and which is disposed in one of the cells. The laser or lasers are disposed in other cells and the deflector is disposed in yet another cell. The cells also provide areas in which the electronic components of the scanning system may be mounted, if desired. The electronic components may be external to the housing and connected to electro-optic elements of the assembly by suitable wiring. The optical elements define a folded optical beam path between the elements extending from the laser or other optical beam generator to the deflector, thence from the deflector outwardly from the body towards the image surface to provide the scan lines forming the image. The walls between the cells have apertures through which the beam passes. The outer surfaces of the body may have a cover placed thereon so as to seal those cells through which the beam path passes, thereby insuring against the contamination of the optical elements or the introduction of dirt and dust which may interfere with scanning.

The foregoing and other objects, features and advantages of the invention as well as presently preferred embodiments thereof will become more apparent from a reading of the following description in connection with the accompanying drawings in which.

Figure 1:
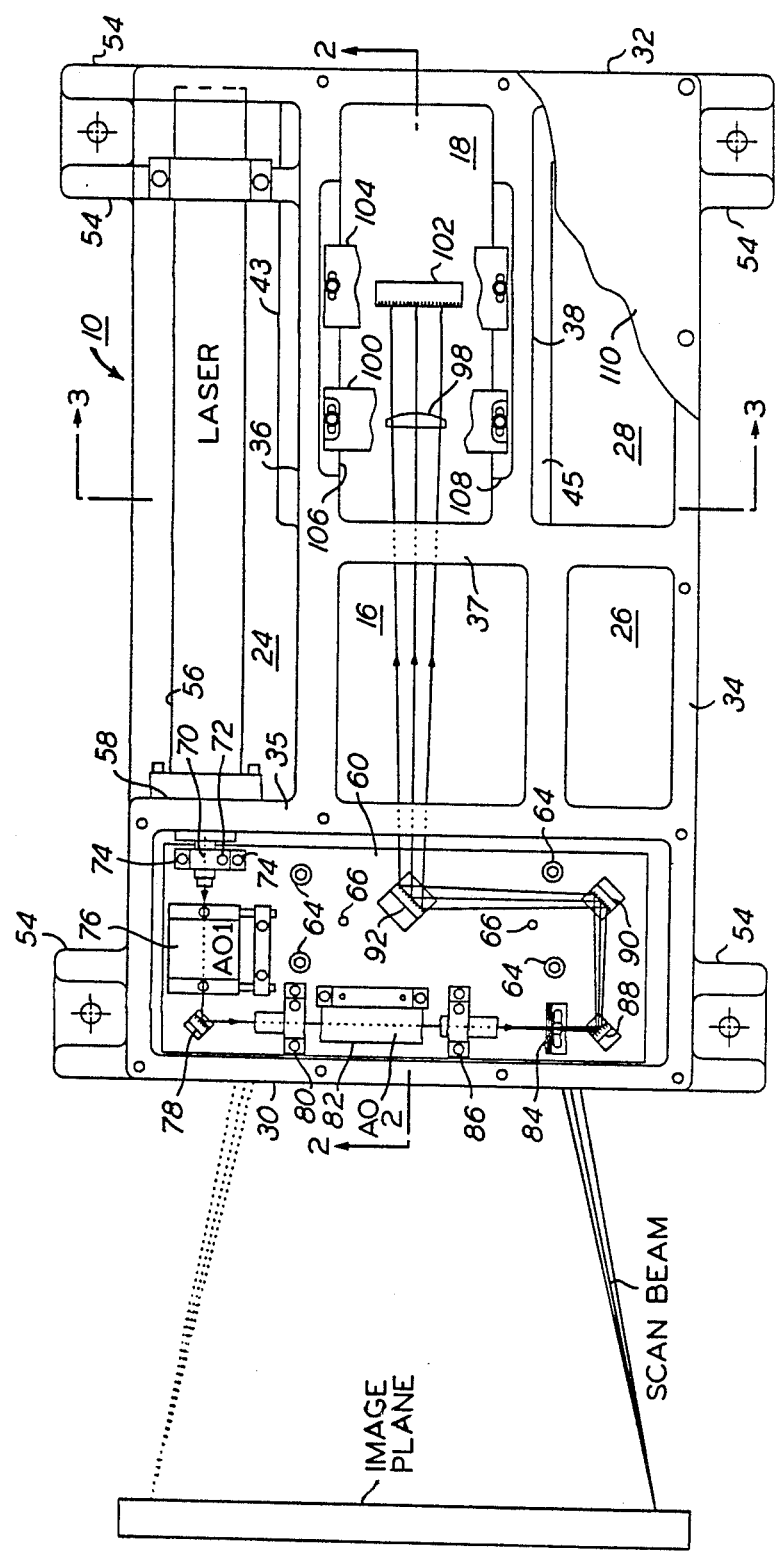
FIG. 1 is a plan view, from the top, of an integrated laser scanning system with the cover plate broken away to show the cells and the components mounted in different ones of these cells.
Figure 2:
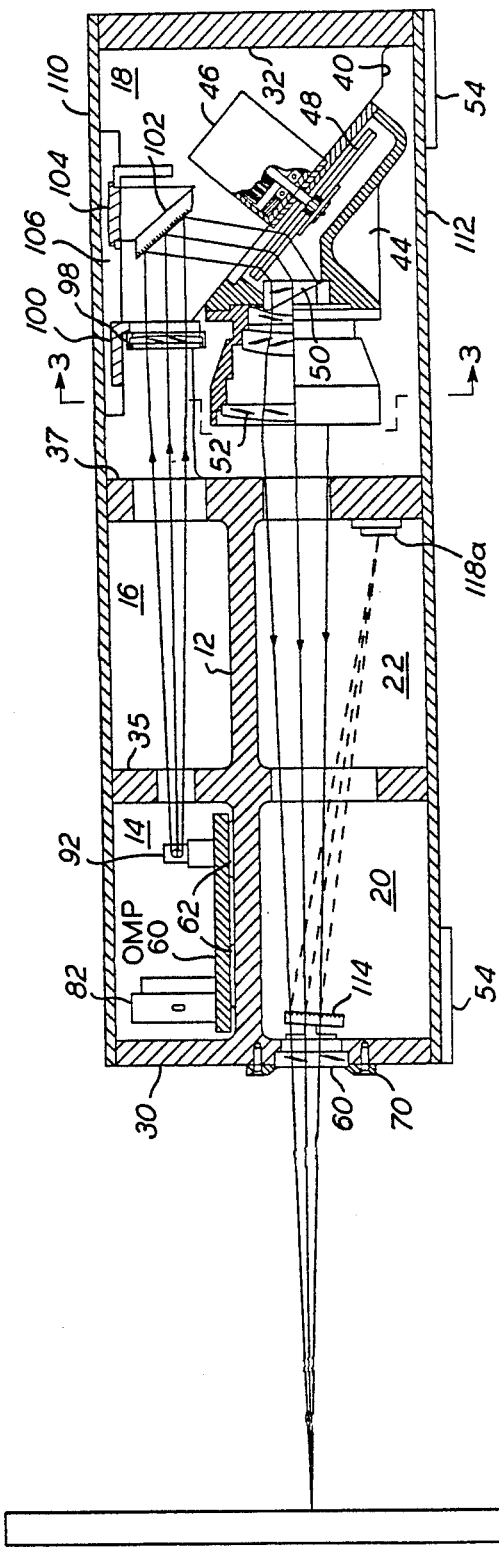
FIG. 2 is a sectional view in elevation, the section being taken along the line 2—2 in FIG. 1.
Figure 3:
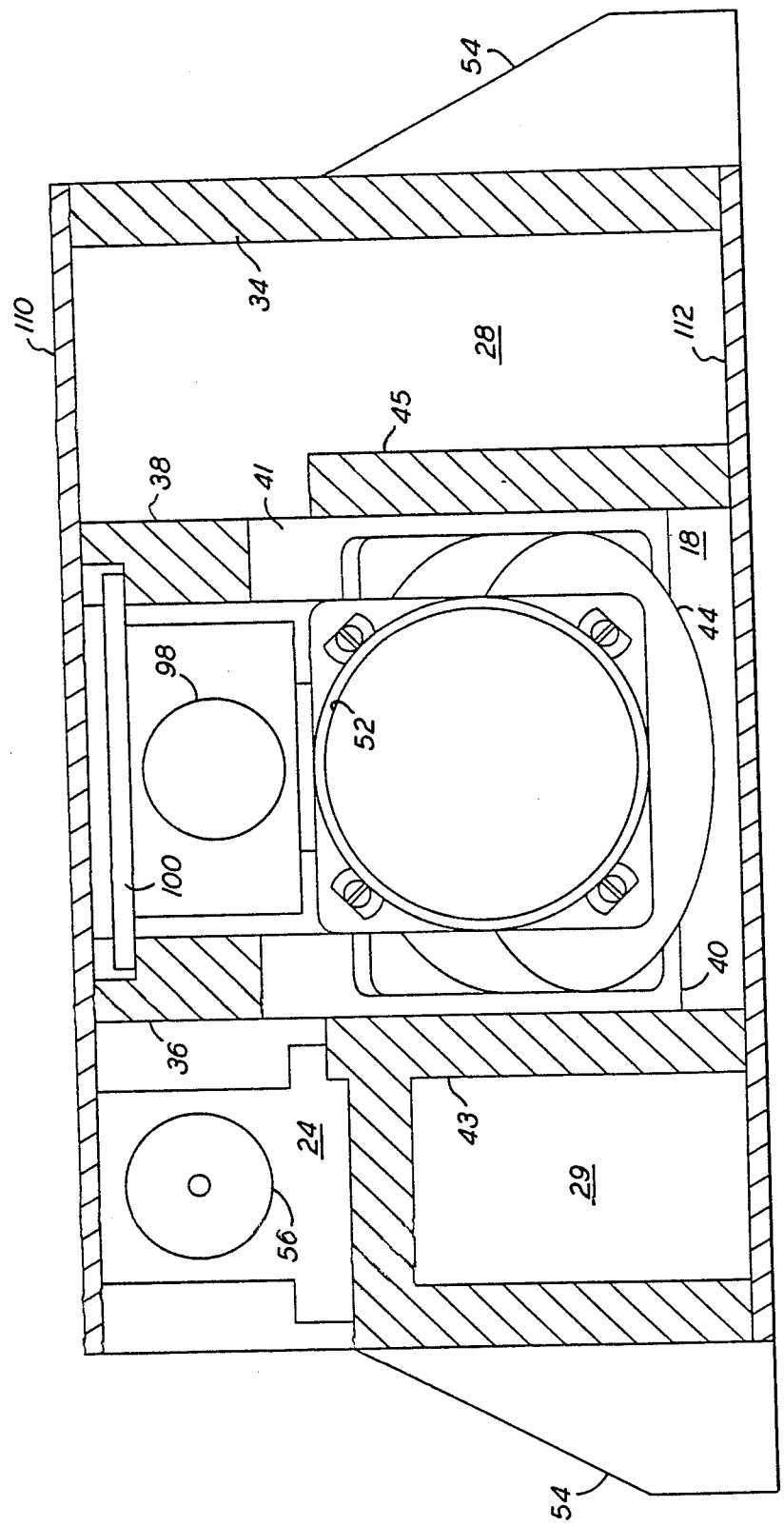
FIG. 3 is another sectional view, in elevation, taken along the lines 3—3 in FIGS. 1 and 2.
Figure 4:
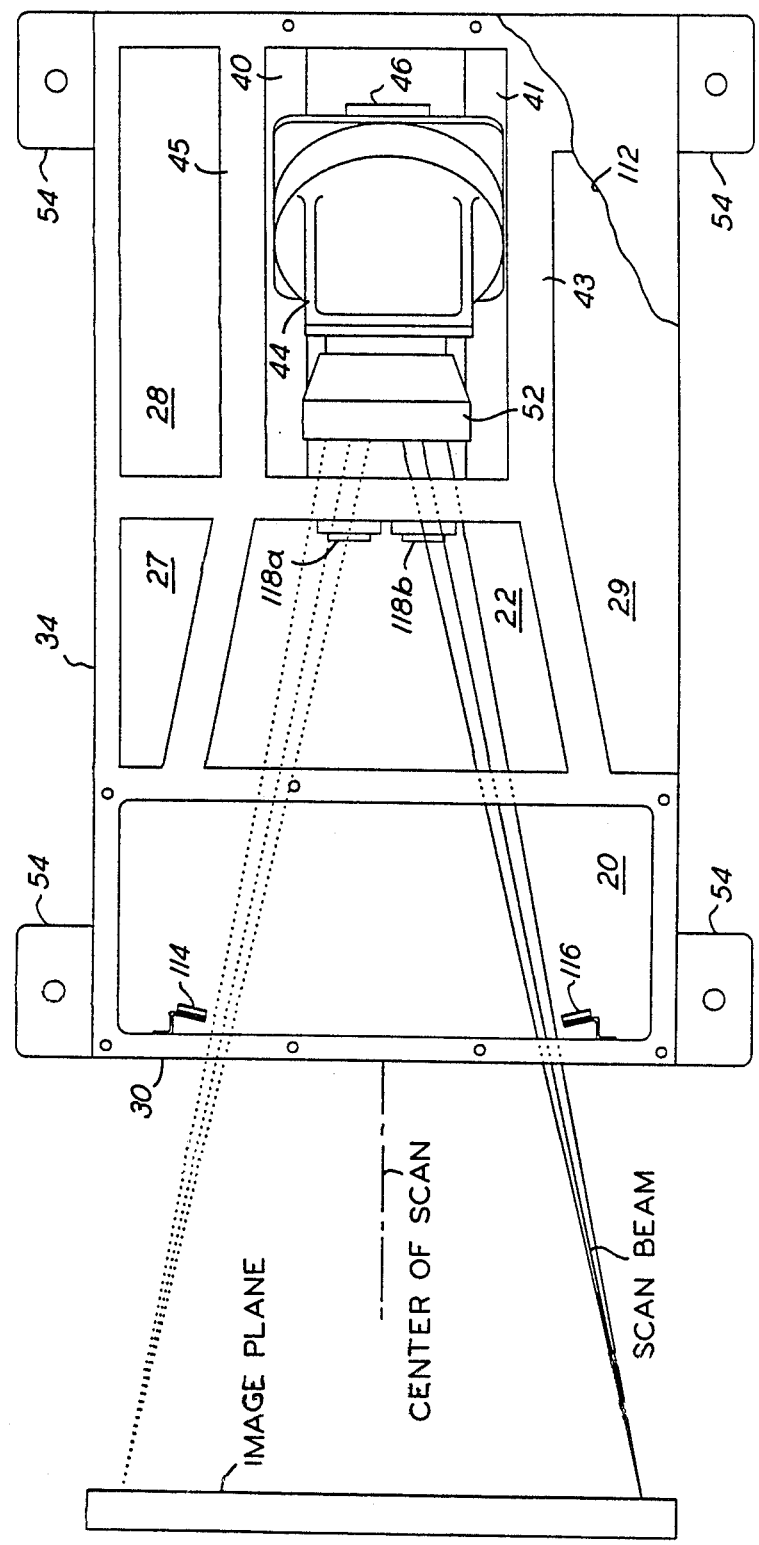
FIG. 4 is a plan view taken from the bottom of the scanning system illustrated in FIGS. 1, 2 and 3.
Figure 5:
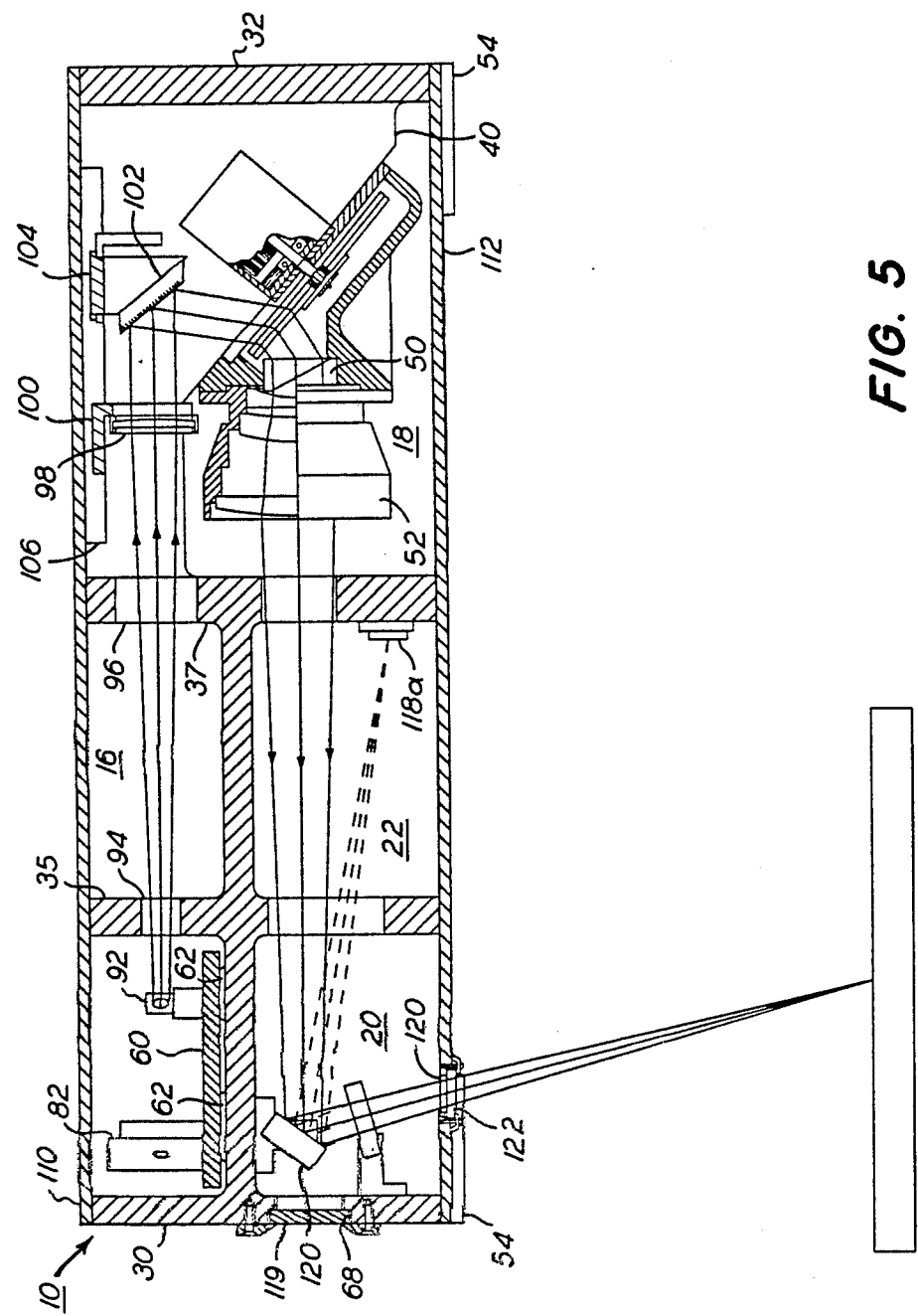
FIG. 5 is a view similar to FIG. 2 wherein means are provided for the exiting of the scanning beam through the bottom of the system.
Figure 6:
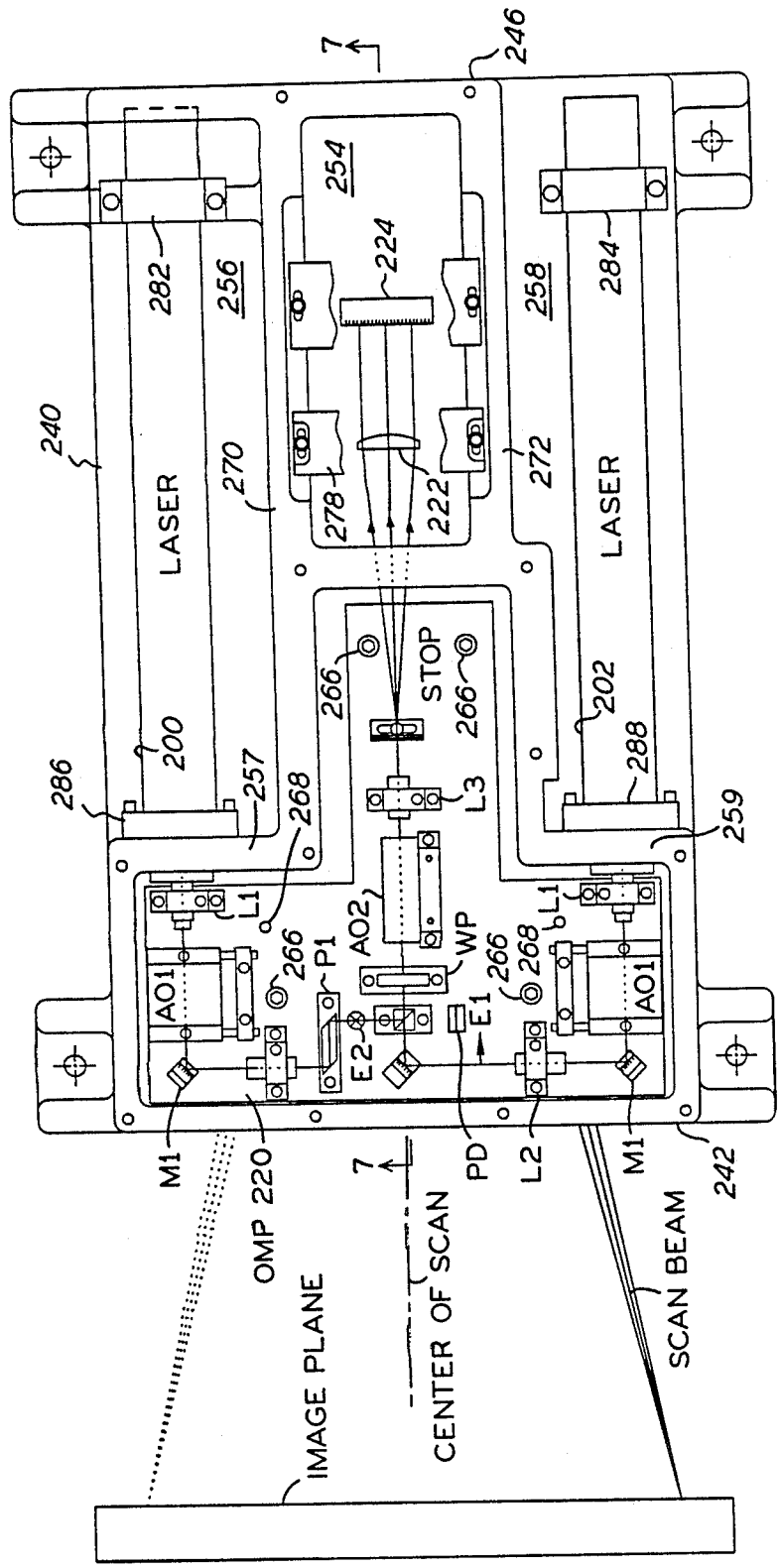
FIG. 6 is a plan view from the top, with the cover removed, of an integrated laser scanning system which utilizes two lasers.
Figure 7:
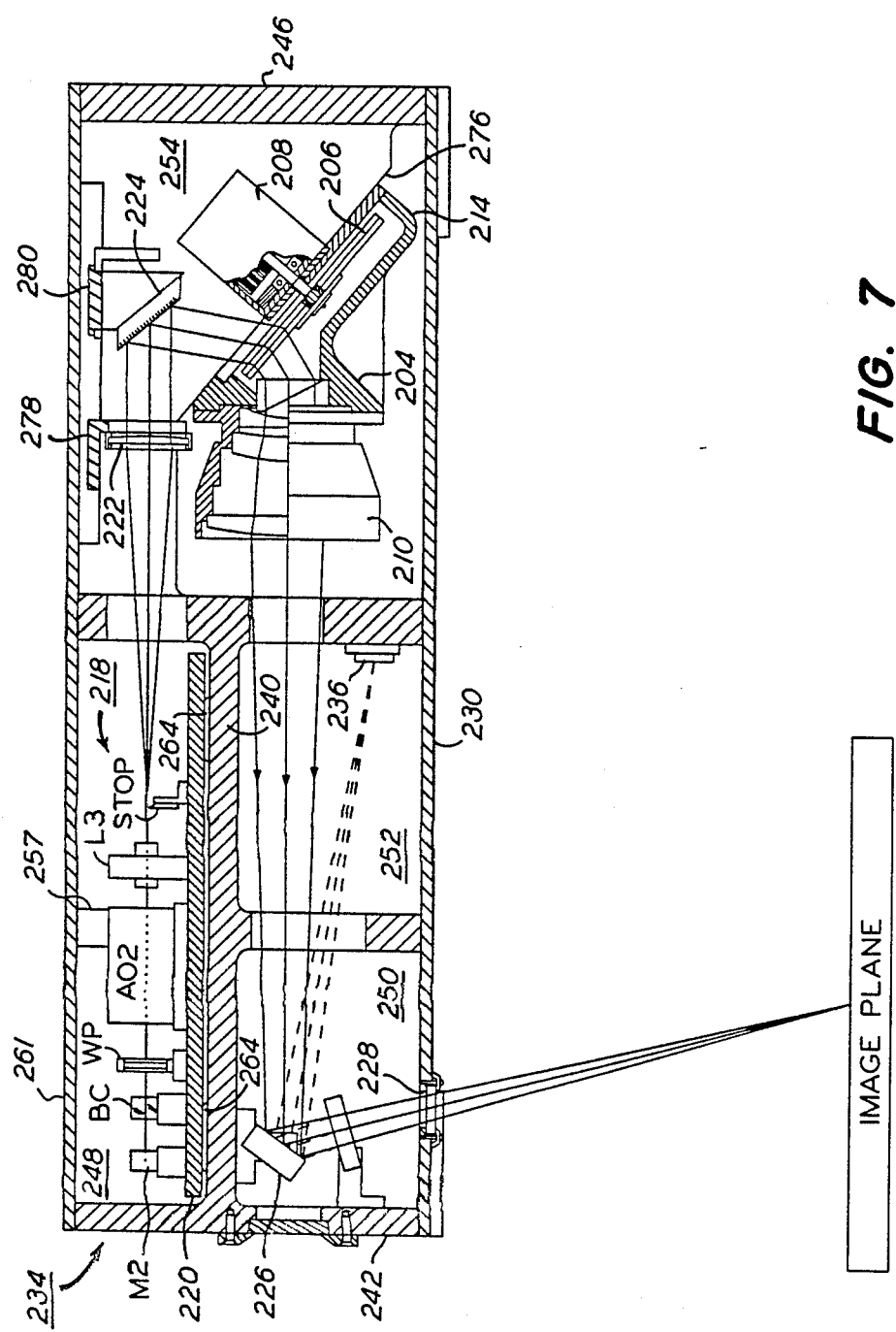
Figure 8:
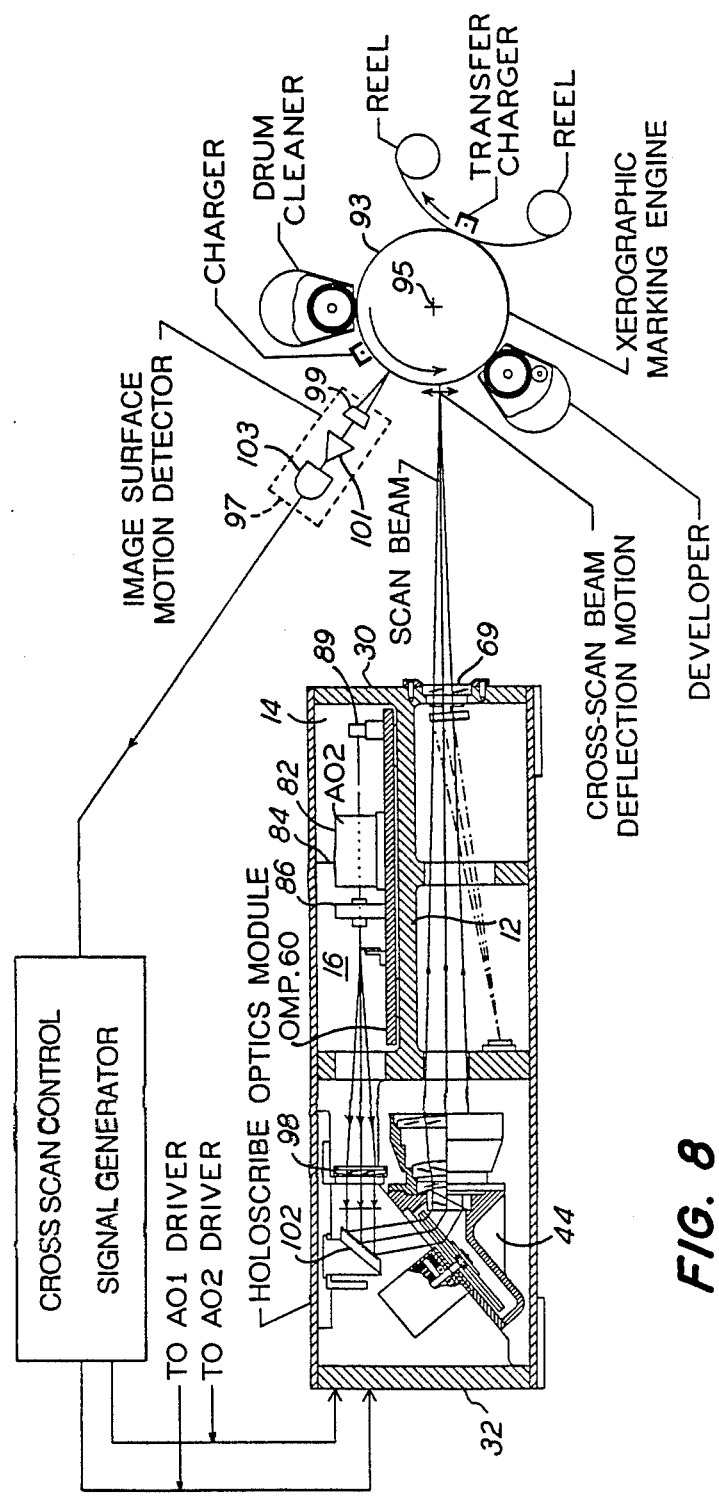

FIG. 7 is a view similar to FIG. 5 of the laser scanning system shown in FIG. 6 the section being taken along the line 7—7 in FIG. 6; and FIG. 8 is a view similar to FIG. 2 but viewed from the opposite side of the unit (i.e., in a direction opposite to that of the arrows at the end of the line 2—2) and with the components on the optical mounting plate, OMP, arranged so that the optical modulator A02 (82), lens 86 and stop 84 are disposed along the center line of the unit.

Referring to FIGS. 1 through 4 there is shown a housing or body 10 which is rigid and stiff, in effect containing a plurality "I"-beams as can be seen from the cross-section (FIG. 2). The body has a center plate 12 which, like the body, is generally rectangular. Walls extend from the plate to define a plurality of cells 14, 16, 18, 20, 22, 24, 26, 27, 28 and 29. The walls 30 and 32 at the ends of the body 10 close these ends. The side 34 of the body is formed by a continuous wall which closes the sides of the cells 14, 20, 26, 27, 28 and 29. Other walls are common to adjacent cells. The cells 24 and 14 share a common wall 35. A portion of the wall 35 between the cell 16 and 14 may be omitted as shown in FIGS. 6, 7 and 8 and an optical mounting plate OMP can be extended into cell 16 as shown in FIGS. 6, 7 and 8.

Walls 36 and 38 of the cell 18 are truncated to form gussets shown at 40 and 41. Buttresses 43 and 45 form lower parts of the walls 36 and 38. These gussets 40 and 41 provide surfaces on which a hologon deflector 44 is mounted. This hologon deflector contains a motor 46 which rotates a hologon disc 48 having holographically formed diffraction gratings in successive pie-shaped facets. This deflector also has a prism 50 and a preobjective lens 52. Such a hologon deflector is similar to design to U.S. Pat. No. 4,610,500 issued Sept. 9, 1986 to Charles J. Kramer, to which reference may be made for further information respecting the hologon deflector 44.

The central plate 12 and the walls which extend from the opposite sides thereof may be integral, and made from a casting of metal, such as aluminum or steel. A rigid Plastic such as ultra high molecular weight polyurethane may be used. The body 10, which is constituted of the plate 12 and the walls extending from opposite sides thereof, is therefore an integral structure. Brackets or mounting pads 54 at the corners of the side walls 24 and 34, which may be projections from the center plate 12, are used for mounting the integrated scanning system in apparatus which uses the same, such as the laser printer.

A laser 56, such as is provided in a cylindrical body and which may be a red helium neon laser, suitably from 2 to 10 milliwatts output power, is mounted by suitable brackets in the cell 24. This laser may have optical components at its output end 58. The output laser beam propagates through an opening in the common wall 35 between the cells 14 and 24. Other lasers, such as a 0.5 mW HeNe green laser, may alternatively be used; selection depending upon printer requirements.

The laser projects a beam of light to optical components which are mounted in the cell 14 on an optical mounting plate (OMP) 60. As shown in FIG. 8 the OMP 60 can extend into cell 16. The mounting plate is assembled on a flat surface of the central plate 12 by means of mounting pads 62 and bolts 64. Alignment pins or holes 66 for receiving such alignment pins are provided by the surface of the plate 12 which forms the floor of the cell 14. Holes in the optical mounting plate 60, or pins which extend from the optical mounting plate into holes in the floor of the cell, index and register the optical mounting plate and the optical components assembled therewith so as to provide accurate alignment of the laser beam along its beam path.

The beam path is a folded path which folds in the cell 18 containing the deflector 44 so that part of the path is above the central plate 12 and part is below the central plate 12 (on opposite sides of the plate). The path extends through a window 68 in the end wall 30 of the body 10. This window contains a transparent (glass) rectangular plate 69 which is held in place by a frame 70 attached to the end wall 40. The frame 70 and the transparent plate seals the window 68.

The beam which exits from the window 68 is the scanning beam which scans an image plane along scan lines. The scan lines may be made up of dots from which half tone images may be formed by virtue of the use of suitable modulating optical elements in the assembly of elements on the mounting plate 60.

This assembly of elements are all mounted on the mounting plate 60 by suitable brackets which may be held to the plate by bolts or rivets. The elements include a lens 70 which is attached to the mounting plate 60 by a bracket 72. The attaching means are bolts 74 which extend through the bracket 72 into the mounting plate. The lens 70 focuses the laser beam into a fast acousto-optic modulator (AO1) 76 which is operated by electronic components such as a generator of pulses repetitive at a rate, e.g. of 50 MHz. This signal may be generated by electronic components which are housed in the cells 26 or 28 or they may be external to the body 10 and connected via a connector in the end wall 32 to the modulator 76 by means of wires (not shown). The acousto-optic modulator 76 may suitably be of the type sold commercially by Newport Electro-optic Systems of Melbourne, Fla., U.S.A. (e.g., their model N15210).

The modulated beam is folded by a mirror 78, collimated by a collimating lens assembly 80 and extends to an acousto-optic diffraction grating modulator (AO2) 82. This modulator establishes a pattern of lines of selected periodicity and optical index in the material of the modulator by means of which the position and intensity of the optical beam may be controlled. By changing the frequency of the control signal to the modulator the position of the beam may be controlled to compensate for cross scan errors due to slight differences in the periodicity of the various grating facets of the deflector 44. This enables each successive scan line on the image plane to be at uniform spacing. In other words cross scan error (deviation in a direction perpendicular to the scanning line) may be compensated using the acousto-optic grating modulator 82. Cross scan errors due to wedge and wobble in the deflector 44 may similarly be compensated by the modulator 82. The grating period in the modulator 82 can be varied during each scan so as to correct for any slant of a scanning line. By changing the amplitude of the drive signal to the modulator 82 the amount of light which is deflected in the zero order, and which is blocked by a stop 84 along the beam path, may be controlled thereby controlling intensity of the scanning beam. This intensity control can be used to correct for scan-to-scan and intrascan intensity variation associated with the facets of the hologon deflector.

A lens 86 between the stop and the modulator 82 allows the beam to diverge so as to insure that the zero order of the beam diffracted in the modulated 82 is blocked by the stop 84.

Mirrors 88 and 90 fold the beam. The beam is again folded along the center line of the body 10 (the center of scan) by another folding mirror 92.

As shown in FIG. 8, modulator 82 (AO2) receives the laser beam via a turning mirror 89 so that the beam is deflected by the modulator as it travels along the center line of the unit. Since the modulator 82 deflects the beam, it may be referred to as a "mini-deflector." The lens 86 and stop 84 are located along the center line and function as described above. In the system of FIG. 8, the turning mirrors 88, 90 and 92 (FIG. 1) are not needed.

It has been found that a major source of scan line spacing error in images recorded with a laser scanner, results from variation in the speed of the motion of the receptor surface which is in the image plane. This may be due to velocity error in the transport system for film when film is used as the receptor or in variation in rotational speed of the drum 93 of a xerographic marking engine as shown in FIG. 8. A film transport using a capstan which can cause variations in film speed is shown in W. H. White, Electronic Publishing and Printing, Aug./Sept. 1986, pages 40–42. The principal components of the marking engine are shown and labeled in FIG. 8. They are conventional. The image is shown, by way of example, transferred to print paper which is driven from reel to reel. Conventional paper sheet feeders can be used.

The mini-deflector 82 is used to compensate for minor positional errors (less than 50 μm for each scan) associated with the xerographic drum rotation mechanism or the capstan rotation mechanism for the film transport system. The mini-deflector moves the scan line down if the drum speeds up or up if the drum slows down.

The control signal may be obtained from a track of bars evenly spaced along the edge of the drum, or from specular reflection from the surface of the drum. An opto-electronic motion detector 97 uses a light source and photodetector 99 (e.g., a light emitting diode focused on the track or on the specularly reflecting surface, and a solid state photodetector). The detector includes an amplifier 101 and digitizer 103. The detector 97 will provide, for the track of bars, a pulse train having a repetition rate which follows the speed variations in the drum. Specular reflection results in a noise signal with a frequency modulation component which follows the speed variations of the drum. The digitizer 103 may be implemented by a comparator which outputs a pulse when the reflected signal level exceeds a threshold level. The moulation is a level which crosses the threshold, and the crossings occur in accordance with the speed variations. The pulse rate from the comparator/digitizer 103, thus, corresponds to the speed variations whether a track or specular reflection is used. The pulse signal is applied to the cross-scan control signal generator 105 where it is converted into an analog signal level corresponding to the pulse rate, as by an R/C circuit or other frequency demodulator. The analog signal then is applied to the driver circuits of the AO-2 mini-deflector 82 to deflect the scan beam in the cross scan direction to minimize the scan line positional errors. The detector 97, generator 105 and the mini-deflector 82 comprise a closed loop feedback system. Alternatively optical encoders on the drum or capstan drive shaft may be used to obtain the control signal. Such encoders are commercially available from BEI Motion Systems Company of Little Rock, Ark. 72203 and Teledyne Gurley of Troy, N.Y. 12181-0088.

The beam path extends through openings 94 and 96 in the wall 35 between the cells 14 and 16 and in the wall 37 between the cell 16 and the cell 18, in which the deflector 44 is located. As shown in FIG. 8 and discussed above, the portion of the wall between cells 14 and 16 can be omitted. A collimating lens assembly 98, which is mounted on a bracket 100, collimates the diverging beam and directs it to another folding mirror 102. This mirror is also mounted on a bracket 104. The brackets 100 and 104 are attached to the walls 36 and 38 in indentations 106 and 108 in the top surfaces of these walls.

The beam is then directed to the hologon deflector disc 48. In the illustrated embodiment the angle of incidence and the diffraction angle from the hologon disc are equal to each other and may be 30°. The prism 50 diverts the beam while the preobjective lens 52 focuses the beam on the image plane. Since the beam is chopped (turned on and off by a digital signal that controls the modulator 76), a sequence of dots is scanned along each scan line on the image plane. These dots may be in varying duration (i.e., of lengths) so as to form a halftone image. Alphanumerics and other line images may similarly be formed by techniques known in the art. The fast modulator 76 can also be operated in the analog video mode, and thereby, be used to generate continuous tone images.

In order to seal the housing, cover plates 110 and 112 are placed over the top and bottom surfaces of the walls. Suitable seals, such as packing or stripping may be used and suitable notches (not shown) for receiving this packing may be provided in the end surfaces of the walls. The cell 24 containing the laser preferably is not covered so as to enable heat to be dissipated from the laser. All of the other cells which contain the beam path are covered and contamination, e.g., the entry of dust or other foreign material, which can interfere with the beam is precluded from entering these cells. The sealed cells may also be purged with a non-reactive gas which may be introduced into the sealed body by means of a port (not shown). A suitable gas is nitrogen.

Mirrors 114 and 116 are located on the end wall 30 at the end of the scan (at predetermined distances laterally from the center of scan). These mirrors are best shown in the bottom view FIG. 4. These mirrors deflect the beam onto start-of-scan and end-of-scan photoelectric detectors (EOS and SOS) 118A and 118B. These detectors are used to measure the time of flight of the scan beam across the image plane. Time of flight information is used to correct in-scan positional errors associated with hologon deflector motor hunting. This correction is accomplished by varying the pixel data clock rate. This is the rate that the fast modulator 76 is turned on and off to produce the dots.

In order to compensate for lateral position errors associated with the motion of the receptor surface, the bars or bands of the track on the edge of the drum are shaped in the form of wedges. Then the width of the pulses and the duty cycle of the pulse train from the detector 97 will vary in accordance with the lateral displacement of the drum which is in a direction along its axis 95 of rotation. The signal generator 105 detects the leading and trailing edges of such pulse and develops, using a high frequency clock pulse counter started and stopped on the leading and trailing edges and/or a R/C charging circuit, a voltage corresponding to the pulse width. The rate of change in the voltage is detected and provides a control signal which varies the start of scan and time of flight signals which control the pixel data clock rate signals to the fast modulator AO-1 driver circuit. The scan line then starts earlier or later in time and the location of the dots is varied to compensate for lateral positional errors in the same way and in addition to the variation to accommodate for hologon deflector motor hunting.

Referring to FIG. 5, it will be seen that the scanning system is similar to the system illustrated in FIGS. 1 to 4, and like parts are indicated by like reference numerals. The difference between the system of FIG. 5 and that of FIGS. 1 to 4 is that the window 68 is sealed by a non-transmissive plate 119. Another mirror 120 is mounted on the undersurface of the central plate 12 in the cell 20, and directs the scanning beam to an image surface below the housing. The scanning beam passes through a window 120 in the cover 112. This window has a transmissive plate 122 and is hermetically sealed like the window 68 with a frame 124. The end of scan mirrors, one of which 126 is shown in FIG. 5, deflect the scanning beam at the ends of scan back to the mirror 128 and thence to one of the SOS and EOS detectors, one of which 118A is shown in FIG. 5.

Referring to FIGS. 6 and 7, there is shown an integrated laser scanning system which utilizes a pair of lasers 200 and 202. These lasers may be helium neon lasers each of the same power rating (e.g. from 2 to 10 mW) and are contained in cylindrical housings.

The system also includes a hologon deflector 204 of a design generally similar to that shown in U.S. Pat. No. 4,610,500 issued Sept. 9, 1986 to Charles J. Kramer. The deflector has a hologon disc 206 which is rotated by a motor 208. A preobjective lens 210 and bending prism 212 are assembled to the housing 214 of the deflector 204. The hologon disc has a plurality of successive pie-shaped grating facets which deflect the beam. The angle of incidence and the angle of diffraction may be equal and, for example suitably 30°.

The scanning system illustrated in FIGS. 6 and 7 includes an assembly 218 of optical elements mounted on an optical mounting plate (OMP) 220 for combining the beams from the two lasers and directing the combined beams to the hologon deflector 206. There are also a collimating lens assembly 222 and a bending mirror 224 which collimate the combined beam and direct it at the selected angle of incidence (in the illustrated case vertically downward) to the hologon disc 206. The scanning beam is reflected by a mirror 226 out of a window 228 in a lower cover plate 230 of a housing 234 onto an image plane where the scanning beam scans the scanning lines. The receptor surface may be moved so as to scan successive lines each of which having a pattern of dots from which a half-tone image can be formed.

The ends of scan are detected by means of mirrors 236, one of which is shown in FIG. 7, which retroreflect light from the beam at the end of scan to a mirror 226, and thence to photoelectric SOS and EOS detectors 238, one of which is also shown in FIG. 7. The detected signals may be used to control the data scanning rate.

The housing 234 is made up of a body having a central plate 240 from which end walls 242 and 246 extend, each from an opposite side of the plate 240. Walls, having apertures for the passage of the beam extend from the surface and define a plurality of cells 248, 250, 252, 254, 256 and 258. The cells 256 and 258 contain the lasers 200 and 202. These laser cells share common walls 257 and 259 with the cell 248 containing the assembly 218 of optical components which combine and modulate the laser beams. The central plate 240 and the walls may be a casting of steel, aluminum or plastic and constitutes an integral body of high stiffness and rigidity, since the plate and walls form a plurality of "I"-beams which extend both longitudinally and laterally (across the length and width) of the body 234.

It will be observed that the beam path to the deflector 204 and from the deflector is folded and extends along opposite sides of the central plate 240 thereby enabling the integrated assembly to be volume efficient.

If desired, the beam may extend through the end wall (the left end of the housing body 234) instead of through the bottom (the cover plate 230) through the window 228 therein. Then the folding mirror 226 may be dispensed with and the end of scan reflecting mirrors 236 disposed further upwardly in the path of the beam which exits the end wall 242.

The cover 230 may be sealed with suitable packing which can provide a hermetic seal to the end surfaces of the wall over those cells which contain components handling the beam path or through which the beam path passes. Another cover 261 which covers and may be hermetically sealed to the upper end surfaces of the walls of the cells, through which the beam path passes, also can hermetically seal those cells and prevent contamination of the beam handling components as well as the introduction of dust or dirt which can interfere with the transmission of the beam. The entire sealed housing may be purged with and contain an inert gas, such as nitrogen, which may be introduced through ports (not shown).

The assembly 218 is mounted in the cell 248 by means of mounting pads under the OMP 220, two of which 264 are shown in FIG. 7. The mounting plate 220 of the assembly 218 is held down by bolts 266 which extend through these pads. The plate and the components thereon are further aligned by pins 268 which may extend from the plate into holes in the central plate 240 or from the central plate into holes in the mounting plate 220.

The walls 270 and 272 of the cell 254 are cut away to define gussets having surfaces 276 on which the housing of the hologon deflector is mounted. These walls 270 and 272 are also recessed so as to provide surfaces on which brackets 278 and 280 for the mirror 224 and collimating lens assembly 222 can be attached. These walls are formed with buttresses in the lower portions thereof as shown at 43 and 45 in FIGS. 1 and 3. With the assembly 218 mounted in place and with the collimating lens 222 and mirror 224 and the hologon deflector 204 mounted in the body 234, there is provided an integrated scanning system with all optical components in alignment, which alignment is maintained because of the rigid, stiff body 234 on which the components are mounted.

It will be noted that the lasers 200 and 202 are mounted by brackets 282 and 284 on the central plate 240. These brackets and other brackets 286 and 288 which extend into the walls 257 and 259 enable the lasers to be rotated. Such rotation enables the beams exiting from the lasers to have predetermined polarizations which are orthogonal to each other and which enable the laser beams to be combined for modulation and deflection by the hologon deflector 204. It will be also noted that the optical components of the assembly 218 which are mounted on the mounting plate 220 are held down by their individual brackets which are bolted in place to the plate 220 so as to enable their adjustment and alignment as an assembly on the mounting plate 220.

The use of two lasers enables two beams to be scanned simultaneously across the image plane. This effectively doubles the scanning rate and provides twice the number of dots on the image plane than with a single beam. The use of two beams avoids the necessity of rotating the hologon disc at twice the speed. Rotation at twice its normal speed (for example 24,000 rpm instead of 12,000 rpm) may create stresses beyond the ability of the disc and motor physically to withstand. In addition, in order to double the number of dots per unit length in a single beam, the beam would have to be chopped (turned on and off) at twice the rate. The electronics and modulators operate reliably at approximately a 50 MHz rate. To increase the rate to 100 MHz would adversely affect the reliability of the modulators. Modulators which are commercially available, for example from Newport Electro-optic Systems of Melbourne, Fla. U.S.A. are only rated at approximately 50 MHz. An additional advantage is that the two lasers provide more power at lower cost than a single higher power laser.

Interactions between a pair of laser beams, in a common modulator, and the requirement that the beams incident on the hologon deflector be diffracted and scanned with like efficiency so that the same beam intensity is obtained in the dots from both beams which are simultaneously scanned, are overcome by combining orthogonally polarized beams from each of the lasers, converting the polarization of those beams after combination into circularly polarized beams, but of opposite sense (one being circularly polarized in a left hand sense and the other in a right hand sense). The circularly polarized beams are equally affected during modulation, and since circular polarization is the average of their S and P polarizations, the efficiency of diffraction in the hologon deflector is the same for each of the circularly polarized beams, regardless of their hand. Accordingly, the advantages of the use of plural beams, without the disadvantages occurring upon the mixing thereof, is obtained.

As noted above the lasers are oriented so that the polarization from one of the lasers indicated at E-1 in the drawing is orthogonal to the polarization from the other laser which is indicated at E-2 (into the plane of the paper) in FIG. 6.

First lenses, L-1 focus the beams from the lasers 200 and 202 into fast acousto-optic modulators AO-1. These modulators may be of the type which chop (turn on and off) the beam so as to provide the dots along the scan line at the desired rate (dots per inch or centimeter). These modulators AO-1 may be commercial units of the type identified above (e.g., available from Newport Electro-optic Systems of Melbourne, Florida, USA - their model N15210). The electronics for operating the modulators AO-1 and an acousto-optic diffraction grating modulator AO-2 is provided by signal processing and generating electronics of conventional design which may be mounted externally or in cells, below the cells containing, the lasers internally of the housing 234, or located outside the housing 234 in a separate enclosure The chopped beams are turned by mirrors M-1 and collimated by lenses L-2. The orthogonally polarized beams are deflected, by another mirror M-2 and by a prism P-1, into a polarization sensitive beam combiner BC. The BC element can be a multi-layer dielectric coated mirror or a grating element having a wavelength to grating period equal to 1.4142. This combiner allows the beam of polarization E-1 to pass through without reflection while it totally reflects the beam of polarization E-2. The use of orthogonal polarizations and the polarization sensitive combiner, BC, ensure high beam combining efficiency. The beams may be slightly displaced by tilting the mirror M-2. In this connection, the mirror M-2 may have piezo-electric adjusting elements so as to adjust the beam in both cross scan and in scan directions (perpendicular to, and in the direction of the scan lines). A dual zone photodetector PD may be used to sense the location of the dual beams and provide control signals to the piezo-electric adjusting elements of mirror M-2. The design of circuitry for driving control signals for the adjusting elements is disclosed in A. Arimoto, et al., Appl, Optics. 26, 13, pps. 2554–2557 (July 1, 1987). Two beams, which are collinear with each other in the scan direction and can have a slight offset in the cross-scan direction, are then passed through a quarter waveplate WP, which imposes a phase shift of 90° at the wavelength of the laser beams (the wavelength being the same for both beams). Accordingly, the output beams from the waveplate WP are circularly polarized. Because the beams have orthogonal polarizations, their circular polarization will be of opposite hands (in opposite senses).

The modulation of the intensity of the beams and also their tilt (to adjust for cross scan errors due to errors in facet to facet grating periodic of the deflector disc 206 and deflector wobble and wedge errors) is accomplished in an acousto-optic diffraction grating modulator AO-2. AO-2 may be a commercial unit, suitably Model DLM-40-V-7 sold by Anderson Laboratories of Bloomfield, Connecticut, USA. Since the beams are circularly polarized, the modulator affects each beam in the same way and provides the same tilt and intensity modulation to the beams.

Upon leaving the modulator the beams pass through a lens which has a focus ahead of a stop. The stop traps and blocks the zero order diffraction component from the diffraction grating modulator AO-2. The first order diffraction component continues diverging until it reaches the collimating lens 222. In the event that the lens L-3 does not sufficiently diverge the beam another negative (diverging) lens may be mounted on the mounting plate 220 between the stop and the collimating lens 222.

The collimated beams are then deflected by the mirror 224 to the hologon deflector where they are diffracted and scanned across the image plane. Since the hologon deflector has equal efficiency for circularly polarized light, the efficiency being the average efficiency for both the S and P components of polarization of the circularly polarized light, the hologon deflector diffracts both beams with like efficiency and a pair of beams are scanned across the image plane in each line.

From the foregoing description it will be apparent that there has been provided improved scanning apparatus and particularly integrated laser scanner systems. Presently preferred embodiments of these systems have been described. Variations and modifications thereof within the scope of the invention will no doubt become apparent to those skilled in the art. For example, the two laser beams (FIGS. 6 and 8) can be generated from a single laser by means of a beam splitter, with orthogonal polarization, modulated and recombined. This may be desirable when the lasers are expensive components (e.g. argon type lasers). Accordingly, the foregoing description should be taken as illustrative and not in a limiting sense.

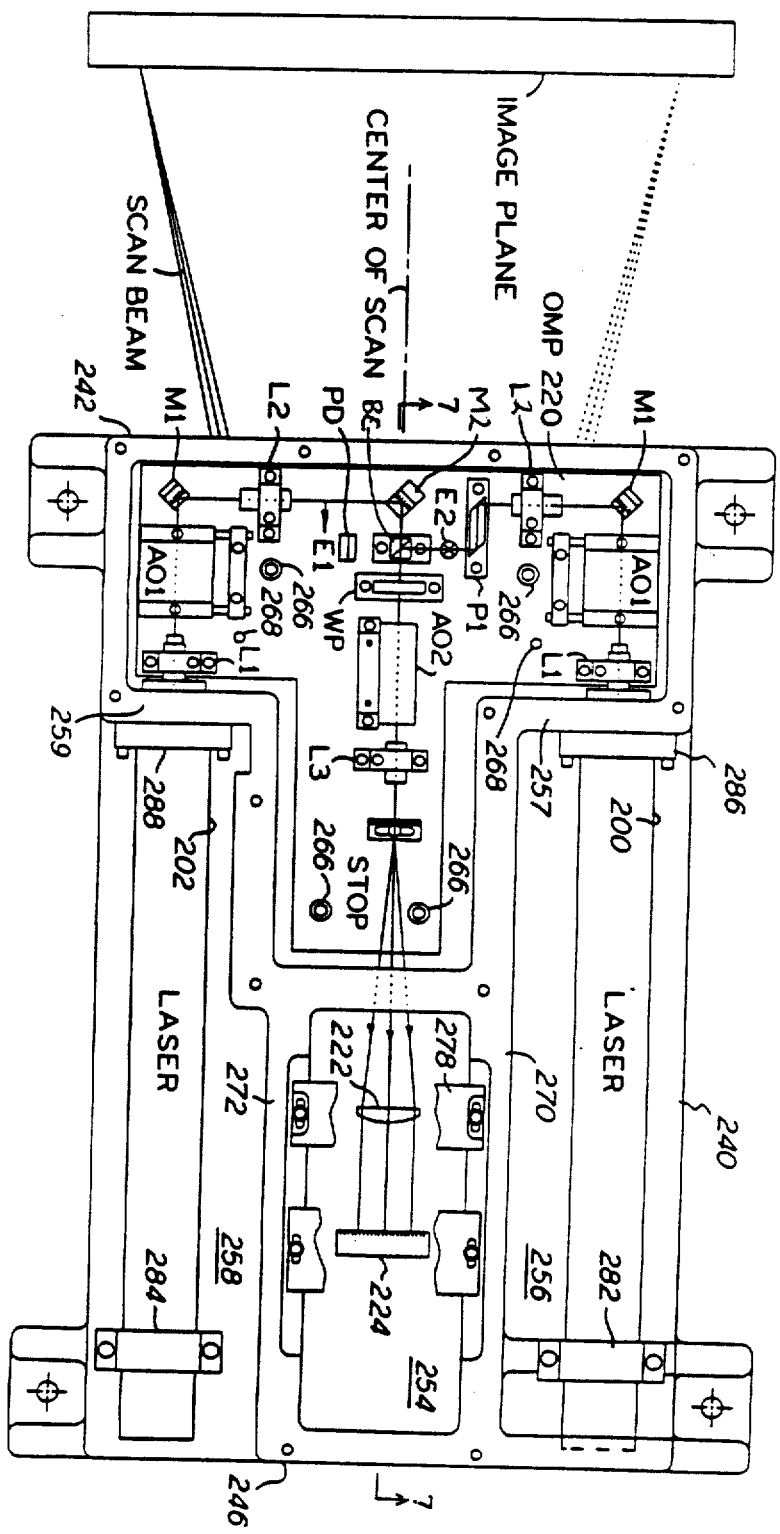

We claim:

1. An integrated optical scanning system which comprises a plate having opposite sides, a plurality of walls connected to said plate and extending away from said opposite sides to define a plurality of cells, said walls and said plate defining a rigid body, a light beam generator, a plurality of optical elements, a beam deflector for scanning a light beam across an image surface external to said body, said generator, said deflector and an assembly containing a plurality of said optical elements being disposed in different ones of said cells to define a folded optical beam path on opposite sides of said plate from said generator, between said elements, to said deflector and from said deflector outwardly from said body toward said image surface, said walls having apertures for the passage of said beam.

2. The system according to claim 1 further comprising covers on at least those of said cells through which said beam path passes for sealing them against contamination.

3. The system according to claim 1 wherein said beam path is folded to provide path portions extending in one direction toward said deflector and in an opposite direction away from said deflector, said path portions being along different ones of said opposite sides of said plate.

4. The system according to claim 1 further comprising a mounting plate having opposite sides on one of which said optical elements of said assembly are mounted, said mounting plate being disposed in one of said cells with the other of said opposite sides of said mounting plate being disposed upon one of said opposite sides of said plate of said body and being attached to said plate of said body.

5. The system according to claim 4 wherein said beam generated is a laser disposed in one of said cells, said laser having an output end through which said beam passes, said output end being disposed at one of said walls which defines the partition between the cells containing said laser and the cell containing said mounting plate with the plurality of optical elements mounted thereon, the optical elements on said mounting plate providing a portion of said beam path from said laser on one of the opposite sides of said body plate.

6. The system according to claim 5 wherein said deflector is disposed in one of said cells which extends from the other of said opposite sides of said body plate, at least one of said plurality of said optical elements disposed in said beam path for turning said beam path in a direction between the opposite sides of said body plate through said body plate to said deflector, said deflector defining the portion of said beam path on said other of said opposite sides of said body plate which is folded in the direction opposite to the portion of said beam path from the elements on said mounting plate to the element for turning said beam path to said deflector.

7. The system according to claim 6 wherein said deflector is a holographic deflector having a rotatable diffraction grating which turns said beam path and scans said beam.

8. The system according to claim 7 wherein the one of said cells containing said deflector extends through said body plate, and the plurality of said walls of said cell containing said deflector defining surfaces to which said deflector is attached.

9. The system according to claim 1 wherein said body is rectangular and said body plate is also rectangular, said walls extending perpendicularly of each other along the length and width of said body plate.

10. The system according to claim 9 wherein the walls define the height of said body, the walls on one of the opposite sides of said body plate all being of the same height and defining the surface of said body on one side thereof, the walls on the other of the sides of said body plate all being of the same height and defining the bottom surface of said body, and coverplates on said top and bottom surfaces covering at least those cells containing said deflector and said optical elements and through which said beam path extends for sealing said last named cells against contamination.

11. The system according to claim 10 wherein the opposite ends of said body which define the length thereof each have a different one of said walls extending across the width of said body away from said opposite sides of said body plate.

12. The system according to claim 1 wherein a pair of said light beam generators are provided each in a different one of said cells, said beam path extending from said generators into the cell containing said assembly which contains said plurality of said optical elements.

13. The system according to claim 12 wherein said cell containing said generators are on opposite sides of the cell containing said deflector.

14. The system according to claim 11 wherein said light beam generator is a first laser and a second laser, said lasers being disposed in different ones of said cells on opposite side of the cell containing said deflector, the cell containing said assembly of optical elements and the cells containing said lasers having one of the walls thereof in common.

15. The system according to claim 14 wherein said assembly has means for combining said beams from said first and second lasers into a combined beam in said cell containing said assembly and for directing said combined beam along the portion of said beam path which extends to said deflector.

16. The system according to claim 1 wherein said body has said walls and plate integral with each other.

17. The system according to claim 16 wherein said body, said walls and plate is an integral casting.

* * * * *

UNITED STATES PATENT AND TRADEMARK OFFICE
CERTIFICATE OF CORRECTION

PATENT NO. : 4,779,944

DATED : October 25, 1988

INVENTOR(S) : Joahim A. Ritter

Page 1 of 2

It is certified that error appears in the above-identified patent and that said Letters Patent is hereby corrected as shown below:

Figure 6 should be deleted to be replaced with figure 6 as shown on the attached sheet.

Signed and Sealed this

Second Day of January, 1990

Attest:

JEFFREY M. SAMUELS

Attesting Officer

Acting Commissioner of Patents and Trademarks